ately at Fowler, in the county of Clinton and State of Michigan, have invented certain new and useful Improvements in Spades and Shovels, of which the following is a specification.

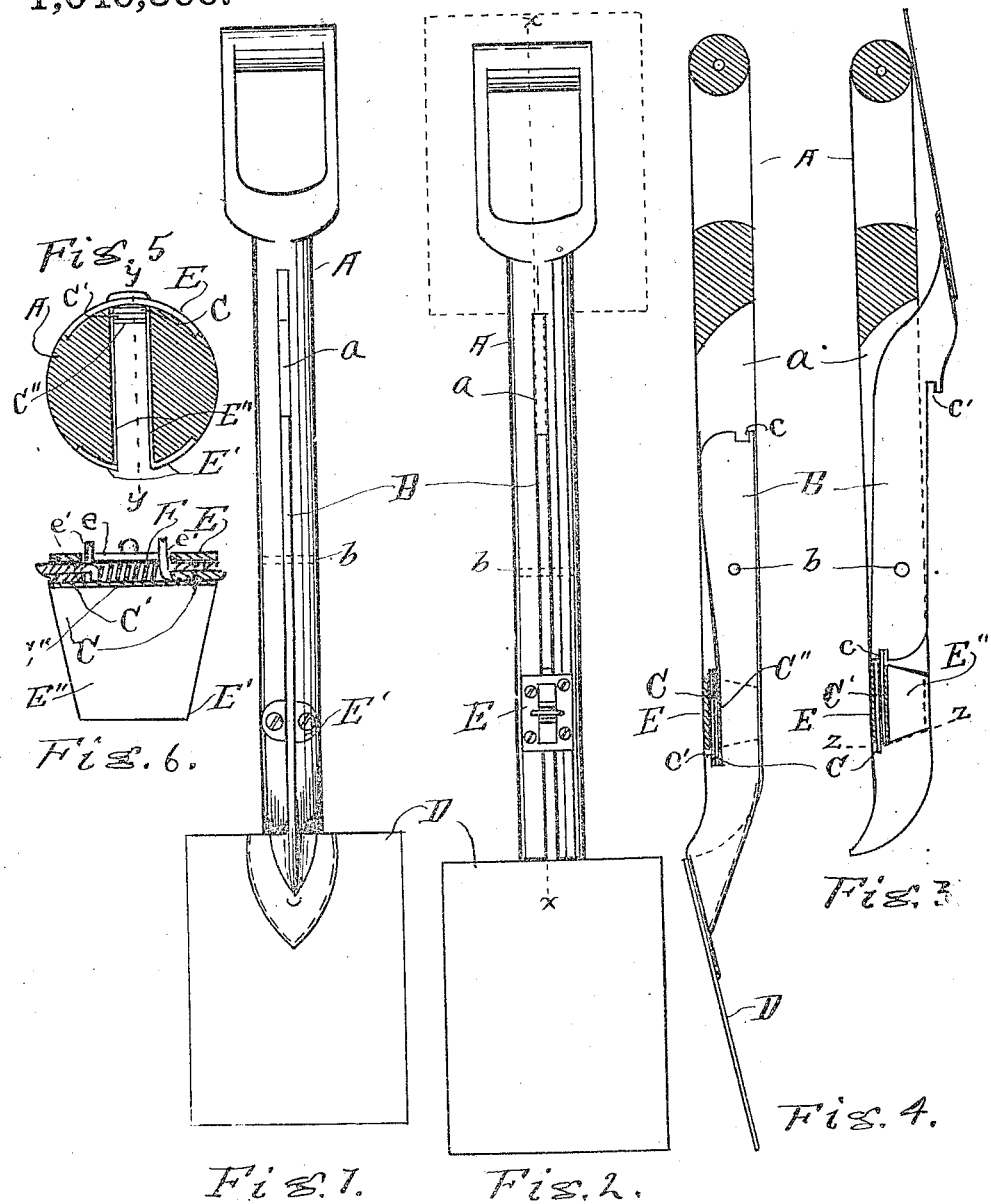

My invention relates to improvements in spades for digging in the soil, and its objects are: first, to provide a spade that may be folded in such a manner that it will be greatly shortened for economizing in space necessary for storing and carrying for hunting or camping purposes. Second, to provide a folding spade that will be held firmly to place when in use or when folded, and, third, to provide a spade of the kind stated with which the prying or lifting properties of the handle will not be materially lessened by reason of slotting the same for the reception of the shank of the spade. I attain these objects by the mechanism illustrated in the accompanying drawing, in which—

Figure 1 is a front, and Fig. 2 is a back elevation of the spade extended for use. Fig. 3 is a sectional elevation of the spade handle on the line $x$ $x$ of Fig. 2, with the spade folded back upon the handle. Fig. 4 is the same with the spade extended in position for use in digging in the ground. Fig. 5 is a cross section of the handle on the line $z$ $z$ of Fig. 3 showing the locking and strengthening clamps, Fig. 6 is a sectional view of the locking clamp practically on the line $y$ $y$ of Fig. 5, and Fig. 7 is the pivot pin.

Similar letters refer to similar parts throughout the several views.

The handle, A, of this spade is slotted from the lower end upward, as indicated at $a$, for the reception and free action of the shank B of the spade, which is a thin broad shank made integral with the spade and projecting upward some distance therefrom, as indicated in the several figures. This shank is pivotally secured in the slot $a$ of the handle, as indicated at $b$, in such a manner that the spade may be folded upon the handle, as indicated in Fig. 3, or it may be extended longitudinally, as indicated in Figs. 1, 2 and 4.

To avoid inconvenience, it is necessary that this spade be locked to place whether it is extended or folded, and for this purpose I place a catch, as E, E', upon the handle A and pass the connecting sheets between these parts through the slot $a$ in the handle in such a manner that the two plates, E and E', form strong resistance elements covering a portion of the periphery of the handle at each side adjacent to the slot, and the connecting sheets E'', made integral with the plates E, E', form a very strong supporting element for the shank of the spade when such element is necessary in digging into the ground. A slot $e$ is made in the plate E for the passage of the stems $e'$, which stems are made integral with the slides or catches C, C' so that said catches may be readily slid between the plates E and C''. These catches are actuated to force them outward by means of any available form of spring, as indicated at F in Fig. 6, to hold them temporarily to position so that the ends will project beyond the edges of the plate E so that they may be utilized as latches to engage with the notches $c$ and $c'$ in the shank B of the spade to hold said shank, and the spade firmly to place in whichever position, as shown in Figs. 3 and 4, it may be placed. Thus, if the spade is folded back upon the handle, as in Fig. 3, the catch or latch C' engages the notch $c$, and if the spade is extended, as in Fig. 4 the catch C engages the notch $c'$ and the spade is held firmly against moving or turning on the pivot pin $b$, as hereinbefore suggested.

When the spade is extended, as in Fig. 4, the back edge of the shank B rests firmly upon the inner sheet C'' which, with the pivot pin $b$, and by reason of the sheets E'' extending through the slot the width of the handle and being made integral with the plates E', which in turn are secured to the handle, forms a firm unyielding support for the spade when in use for digging.

Care must be taken to place the pivot pin $b$ in such position, relative to the longitudinal measurement of the shank B that when the spade is folded or extended the notches $c$ and $c'$ will be in position to exactly register with, or engage the latches or catches C' and C respectively.

The pivot pin $b$ is provided with a loose sleeve $b'$ that extends nearly the length of the body of the pin, and with a thimble $b''$ at each end, one of which is fitted to screw upon the end of the pin, the length of the sleeve and of the necks of the two thimbles being equal to the thickness of the spade handle so that they may be screwed firmly to place without danger of bending the sides of the handle sufficiently to clamp the shank B between them and render it hard to swing the spade from its open to its closed position on the handle, or vice versa.

What I claim as new, and desire to secure by Letters Patent of the United States, is:

In combination, a spade, a thin broad shank extending upward from the spade, a handle having a slot through it for the reception of the shank, a pivot pin for pivotally securing the shank into the slot, said shank having notches therein, latches secured in the slot to engage said notches, and plates secured to the handle and having sheets passed through the slot and connecting said plates to form a supporting bearing for the catches and the shank.

Signed at Fowler Michigan December 14th 1911.

HENRY H. ALTVATER.

In presence of—
J. W. PIERCE,
J. F. SHRAFT.